United States Patent
Cariello

(10) Patent No.: US 11,861,216 B2
(45) Date of Patent: Jan. 2, 2024

(54) DATA RECOVERY USING BARRIER COMMANDS

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 111 days.

(21) Appl. No.: 17/645,184

(22) Filed: Dec. 20, 2021

(65) Prior Publication Data

US 2023/0195369 A1    Jun. 22, 2023

(51) Int. Cl.
*G06F 12/00*  (2006.01)
*G06F 3/06*  (2006.01)

(52) U.S. Cl.
CPC .......... *G06F 3/0656* (2013.01); *G06F 3/0619* (2013.01); *G06F 3/0659* (2013.01); *G06F 3/0679* (2013.01)

(58) Field of Classification Search
USPC ........................................................ 711/154
See application file for complete search history.

(56) References Cited

U.S. PATENT DOCUMENTS 7,574,565 B2 *  8/2009  De Souza ........... G06F 12/0804
                                                       711/135

FOREIGN PATENT DOCUMENTS

CN          110033799       *  4/2017

* cited by examiner

*Primary Examiner* — Mardochee Chery
(74) *Attorney, Agent, or Firm* — Holland & Hart LLP

(57) ABSTRACT

Methods, systems, and devices for memory operations are described. Data for a set of commands associated with a barrier command may be written to a buffer. Based on a portion of the data to be flushed from the buffer, a determination may be made as to whether to update an indication of a last barrier command for which all of the associated data has been written to a memory device. Based on whether the indication of the last barrier command is updated, a flushing operation may be performed that transfers the portion of the data from the buffer to a memory device. During a recovery operation, the portion of the data stored in the memory device may be validated based on determining that the barrier command is associated with the portion of the data and on updating the indication of the last barrier command to indicate the barrier command.

25 Claims, 7 Drawing Sheets

DATA RECOVERY USING BARRIER COMMANDS

FIELD OF TECHNOLOGY

The following relates generally to one or more systems for memory and more specifically to data recovery using barrier commands.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
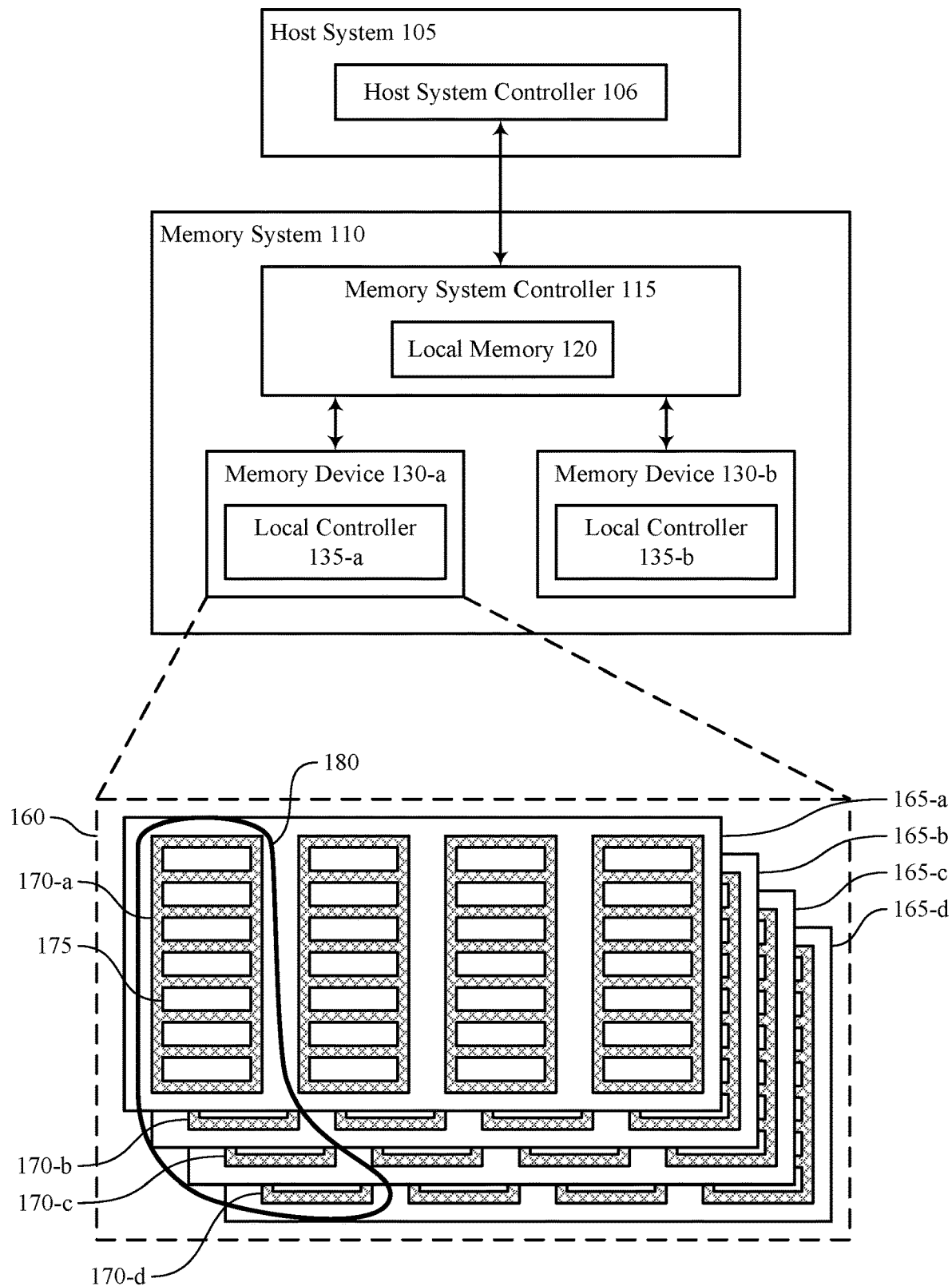
FIG. 1 illustrates an example of a system that supports data recovery using barrier commands in accordance with examples as disclosed herein.

A memory system may transfer data stored in, for example, a buffer to a memory device in accordance with a set of barrier commands, where each barrier command may be associated with respective portions of the data stored in the buffer. For example, the memory system may transfer all of the data associated with one barrier command before transferring the data associated with a next barrier command, and so on. Barrier commands may be used to support recovery procedures performed by the memory system in the event of a data loss event (e.g., an asynchronous power loss). For example, the memory system may determine whether to retain or discard a set of data transferred from, for example, a buffer to a memory device (e.g., where the storage of the data has not yet been confirmed by higher-level processes) based on or in response to determining whether the set of data is associated with a barrier command for which all of the data has been written to the memory device. If the memory system determines that all of the data for the barrier command associated with the set of data has been correctly written, the memory system may retain the set of data. Otherwise, the memory system may discard the set of data.

When a memory system uses a first buffer (which may also be referred to as a cursor) for data having a first characteristic (e.g., single-level data) and a second buffer (which may also be referred to as a cursor) for data having a different characteristic (e.g., multi-level data), the techniques for using barrier commands to recover data after a data loss event may be insufficient—e.g., because data that is associated with a subsequent barrier command in the first buffer may be written before all of the data that is associated with the prior barrier command in the second buffer is written. Thus, the memory system may be unable to confirm that all of the data has been written for a prior barrier command based merely on identifying an index of a subsequent barrier command. Accordingly, the memory system may use other different, less-efficient techniques to confirm whether sets of data stored in a memory device are valid when multiple buffers are used—e.g., the memory system may anticipate flushing in both buffers.

To increase performance of recovery operations when multiple storage locations, such as buffers, are used, enhanced techniques may be implemented to support data recovery using barrier commands. For example, a technique that keeps track of the barrier commands associated with sets of data and a last barrier command for which all of the associated data has been written may be used (which may be referred to as the "last barrier command" or the "last flushed barrier command"). When recovering sets of data, the barrier commands associated with the sets of data may be compared against the last barrier command to determine whether a complete set of data associated with a barrier command has been written—for example, if it is determined that an index of the barrier command associated with a set of data is less than an index of the last barrier command.

Features of the disclosure are initially described in the context of systems, devices, and circuits. Features of the disclosure are also described in the context of a process flow and operational diagrams. These and other features of the disclosure are further illustrated by and described in the context of an apparatus diagram and flowchart that relate to data recovery using barrier commands.

FIG. 1 illustrates an example of a system 100 that supports data recovery using barrier commands in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random-access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support data recovery using barrier commands. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

A controller, such as host system controller 106 or memory system controller 115) may write data for a set of commands that is associated with a barrier command to a buffer. The controller may also perform a flushing operation that transfers at least a portion of the data from the buffer to a memory device 130. Based on (e.g., before or in response to) transferring the at least the portion of the data, the controller may determine whether to update an indication of a last barrier command for which all of the associated data has been written to the memory device 130. During a recovery operation, the controller may validate the portion of the data stored in the memory device 130 based on or in response to determining that the barrier command is associated with the portion of the data and on updating the indication of the last barrier command to indicate the barrier command.

Figure 2:
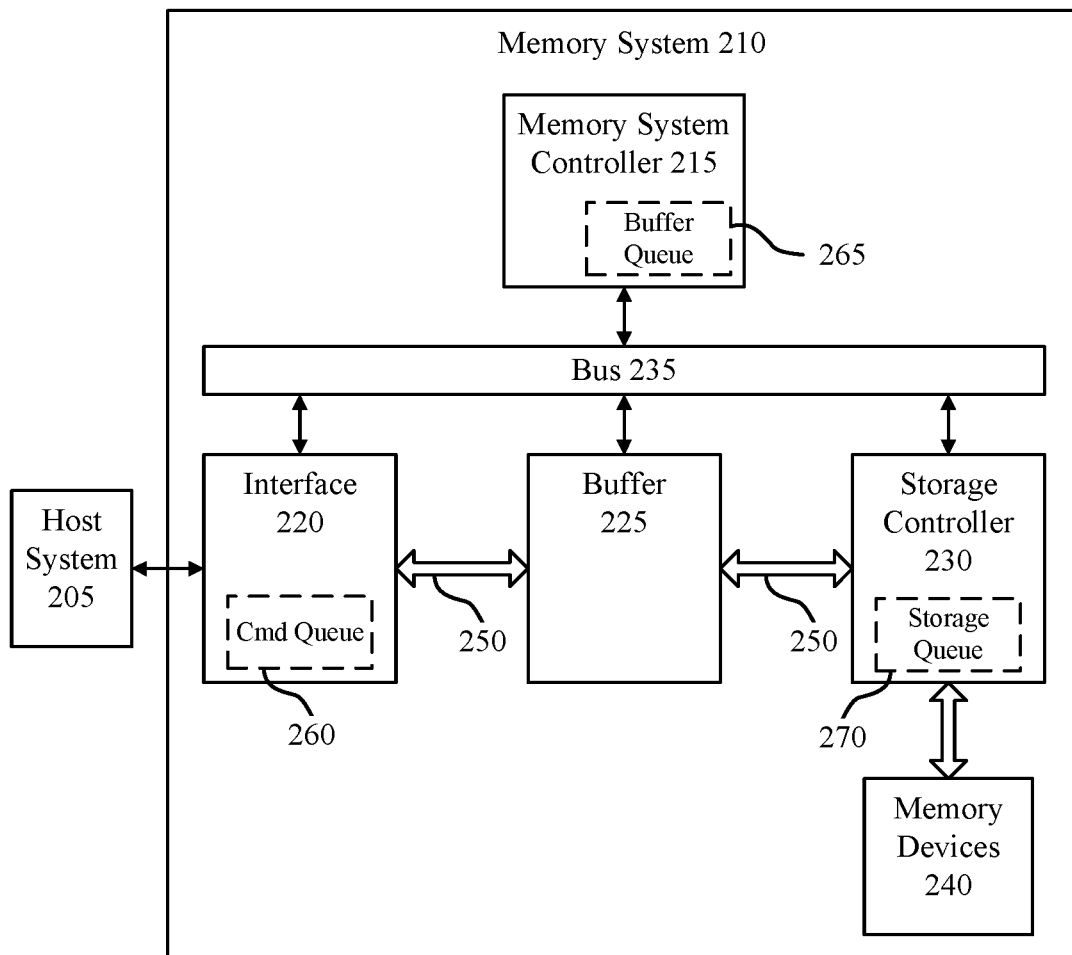
FIG. 2 illustrates an example of a system that supports data recovery using barrier commands in accordance with examples as disclosed herein.

FIG. 2 illustrates an example of a system 200 that supports data recovery using barrier commands in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on or in response to the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

A memory system controller 215 may store data in a buffer (e.g., buffer 225) before storing the data in a memory device of the memory devices 240 (which may be referred to as a transferring operation or a flushing operation). In some examples, a buffer may also be referred to as a cursor. In some examples, the memory system controller 215 stores metadata (e.g., an associated command index) with a set of data that is transferred from the buffer 225 to the memory devices 240. The memory system controller 215 may update an information, such as an L2P table, before the data in the buffer 225 is written from the buffer 225 to one or more of memory devices 240. The updated L2P table may reflect where the data in the buffer 225 will be/is stored within the memory system 210. When "Write Cache" is enabled by the host system 205, the memory system controller 215 may further inform the host system 205 that an operation for executing a programming command received from the host system 205 has been completed when the data is written to the buffer 225—for example, instead of informing the host system 205 when the data is written to the memory devices 240, which may increase latency characteristics from the perspective of the host system 205. Accordingly, if the data is successfully transferred from the buffer 225 to one or more of the memory devices 240, a host system 205 may subsequently access the stored data at a physical address using a corresponding logical address that is known to the host system 205 (at least) as well as is known to the memory system controller 215 in some examples.

In some examples, the memory system controller 215 may execute the received programming commands, for example, in the order in which the programming commands are received. For example, this may include writing the data associated with the programming commands to the buffer in a corresponding order. However, the data stored in the buffer 225 may not necessarily be written to the memory devices 240 in the same order—for example, sets of data corresponding to the commands may be written to the memory devices in a different order than the order in which the corresponding commands were received. In some examples, the memory system controller 215 writes the data stored in the buffer 225 to the memory devices 240 in an order that increases a performance of the memory system 210. For example, the memory system controller 215 may delay writing a large set of data to the memory devices until a background operation is completed, which may decrease power consumption, among other advantages.

Data stored in the buffer 225 may be stored in volatile memory cells. In some examples, the buffer 225 may be or include a DRAM or SRAM device. Thus, data stored in the buffer 225 may be lost in the event of a fault at memory system 210 (e.g., an unexpected power loss or surge). In some examples, an event at the memory system 210 causes the data stored in the buffer 225 to be lost before all of the data stored in the buffer 225 can be written to one of memory devices 240. Because the sets of data corresponding to received programming commands and stored in the buffer 225 may be written to the memory devices 240 in an indeterminate order, the memory system 210 may be unable to determine for which programming commands the corresponding sets of data were fully written to the memory devices 240 prior to the occurrence of the event.

In some examples, a cache synchronization command (which may be referred to as a SYNC CACHE command) or a forced unit access write command (which may be referred to as a FUA WRITE command) causes data stored in the buffer 225 to be written to the memory devices 240 before data for other commands received before or after the cache synchronization or forced unit access write command will be written to the memory devices. Accordingly, after completing the execution of a cache synchronization or force unit access write command, the memory system controller 215 may determine that all of the data stored in the buffer 225 up to a certain command (e.g., the command that precedes the synchronization command) has been written to memory devices 240. Also, in the event that data stored in buffer 225 is lost, the memory system controller 215 may only recover data for a received command was written to memory devices 240. Recovery may start from an established checkpoint after the cache synchronization or forced unit access write commands are completed. In some examples, the checkpoint indicates that the data in an L2P table prior to the creation of the checkpoint is valid and the memory system controller 215 may revert to the pre-checkpoint version of the L2P table after an occurrence of an event that causes the data stored in buffer 225 to be lost.

Additionally, or alternatively, a barrier command (which may be referred to as a BARRIER command) may cause data for certain commands to be written before other commands, in order to keep track for which barrier command all of the associated commands have been written, or both. Particularly, barrier commands may be transmitted between sets of commands, where a set of data for a set of commands that occurs prior to a first barrier command may be written to the memory devices 240 before a set of data for a second set of commands that occur after the first barrier command, and so on. In some examples, an index of an associated barrier command may be stored with a set of data. In the event that data stored in buffer 225 is lost, the memory system controller 215 may determine, during a recovery operation, whether data for a received command was written to memory devices 240, for example based on or in response to establishing a checkpoint after all of the data for the commands associated with a barrier command are written. If, during a recovery process, the memory system controller 215 determines that less than all of the data for a barrier command was written to the memory devices 240, the memory system controller 215 may discard all of the data associated with the barrier command (and may revert a portion of a current L2P table to a corresponding portion of a prior version of the L2P table). In comparison to a cache synchronization of forced unit access write command, the barrier command, when received, may not force data in buffer 225 to be written to the memory devices 240, but instead may enforce a group-based ordering for the recovery process.

In some examples, after recovering from an event that causes the data stored in buffer 225 to be lost, the memory system controller 215 performs a recovery operation to determine which physical addresses of the memory devices are storing valid information. The recovery operation may involve identifying a difference between an earlier version and current version of an L2P table and further determining whether data stored at the disparate physical addresses addressed by the current version and not the earlier version of the L2P table are storing valid data—e.g., by reading metadata stored at the physical addresses. In some examples, the memory system controller 215 determines that the data stored at a portion (or all) of the physical addresses is valid based on or in response to determining that the data is associated with a fully written barrier command—e.g., based on or in response to identifying a set of data associated with a subsequent barrier command.

One or more of the memory devices 240 may include memory cells that can be used to store single-level or multi-level data. For example, a multi-level memory cell (such as a tri-level or quad-level cell) may be capable of storing a single bit of data (which may correspond to single-level data) if a single-level programming operation is used or multiple bits of data (which may correspond to multi-level data) if a multi-level programming operation is used. Based on concurrently supporting the storage of single-level data and multi-level data, the memory system controller 215 may manage virtual blocks that are used to store single-level data (which may be referred to as single-level virtual blocks) and virtual blocks that are used to store multi-level data (which may be referred to as multi-level virtual blocks). In some examples, the memory system 210 may include two buffers (e.g., cursors) to manage single-level and multi-level data—e.g., a first buffer for single-level data and a second buffer for multi-level data.

When a memory system 210 uses a first buffer for single-level data and a second buffer for multi-level data, the techniques for using barrier commands to recover data after a data loss event may be insufficient—e.g., because all of the data in the first buffer and associated with a barrier command may be written (which may also be referred to as "flushed") prior to all of the data in the second buffer and associated with the barrier command. In such cases, data in the first buffer that is associated with a subsequent barrier command may be written before all of the data in the second buffer that is associated with the prior barrier command is written. Thus, the memory system 210 may be unable to confirm that all of the data has been written for a prior barrier command based merely on identifying an index of a subsequent barrier command.

In some examples, to recover from an event that causes data in multiple buffers to be lost, the memory system controller 215 may use a synchronization caching or forced writing operation that causes data across all of the buffers to be transferred to the memory device. In such case, the memory system controller 215 may maintain a global forced writing index that is used to identify data that has been written to the memory devices 240. In such cases, the memory system controller may recover the data only if all of the data associated with a global forced writing index can be recovered—e.g., based on or in response to identifying a subsequent global forced writing index. However, forcing data to be transferred from the buffers may decrease a performance of memory system 210—e.g., by causing operations to be performed earlier than desired.

To increase a write performance without impacting the correctness of the recovery required by the barrier command when multiple buffers are used, enhanced techniques may be used to support data recovery. For example, a technique that keeps track of the barrier commands associated with sets of data and a last barrier command for which all of the associated data has been written may be used. When recovering sets of data, the barrier commands associated with the sets of data may be compared against the last barrier command to determine whether a complete set of data associated with a barrier command has been written—e.g., if it is determined that an index of the barrier command associated with a set of data is less than an index of the last barrier command.

In some examples, a controller (e.g., a memory system controller 215 or a controller at host system 205) may receive or generate a set of commands (e.g., programming commands, read commands, barrier commands) to access the memory devices 240. The controller may write sets of data associated with the sets of commands to the buffer 225. In some examples, the controller may write a first portion of the sets of data to a first buffer in buffer 225 that is used for data having a first characteristic (e.g., data associated with single-level operations) and a second portion of the sets of data to a second buffer in buffer 225 that is used for data having a second characteristic (e.g., data associated with multi-level operations). The controller may also store, with the sets of data (e.g., as metadata), an index of a barrier command associated with the sets of data. The controller may write the sets of data (and metadata) stored in the buffer 225 to the memory devices 240—e.g., as part of one or more flushing operations. Prior to the one or more flushing operations (e.g., prior to each flushing operation), the controller may determine whether to update a field used to keep track of the last barrier command for which all of the associated data has been written may be used—e.g., the controller may update the field to indicate a new barrier command based on or in response to determining that all of the data associated with the barrier command in the first buffer and the second buffer is to be flushed to memory devices 240 in a subsequent flushing operation.

At some point during operation, the memory system 210 may experience a data loss event that causes data in the buffer 225 to be corrupted or erased. During a recovery operation, the memory system 210 may attempt to determine which portions of the data stored in the buffer 225 (relative to an initial point in time) were successfully written to the memory devices 240 prior to the data loss event. The memory system 210 may further attempt to determine whether the portions of the data successfully written to the memory devices 240 should be discarded or recovered. In some examples, if the memory system 210 determines that precedent data (to data written to the memory devices 240) was not written to the memory devices 240 or that only a portion of a set of data was written to the memory devices 240, the memory system may discard (e.g. invalidate, erase) the identified data that was written to the memory devices 240. The memory system 210 may discard data based on or in response to determining that an index of a barrier command associated with the data is greater than or equal to an index of a last flushed barrier command. Also, the memory system 210 may retain data based on or in response to determining that an index of a barrier command associated with the data is less than an index of a last flushed barrier command.

By keeping track of the barrier commands associated with sets of data and a last flushed barrier command, a portion (or all) of data that is flushed, after a checkpoint and prior to a data loss event, from multiple buffers to a memory device may be recovered.

Figure 3:
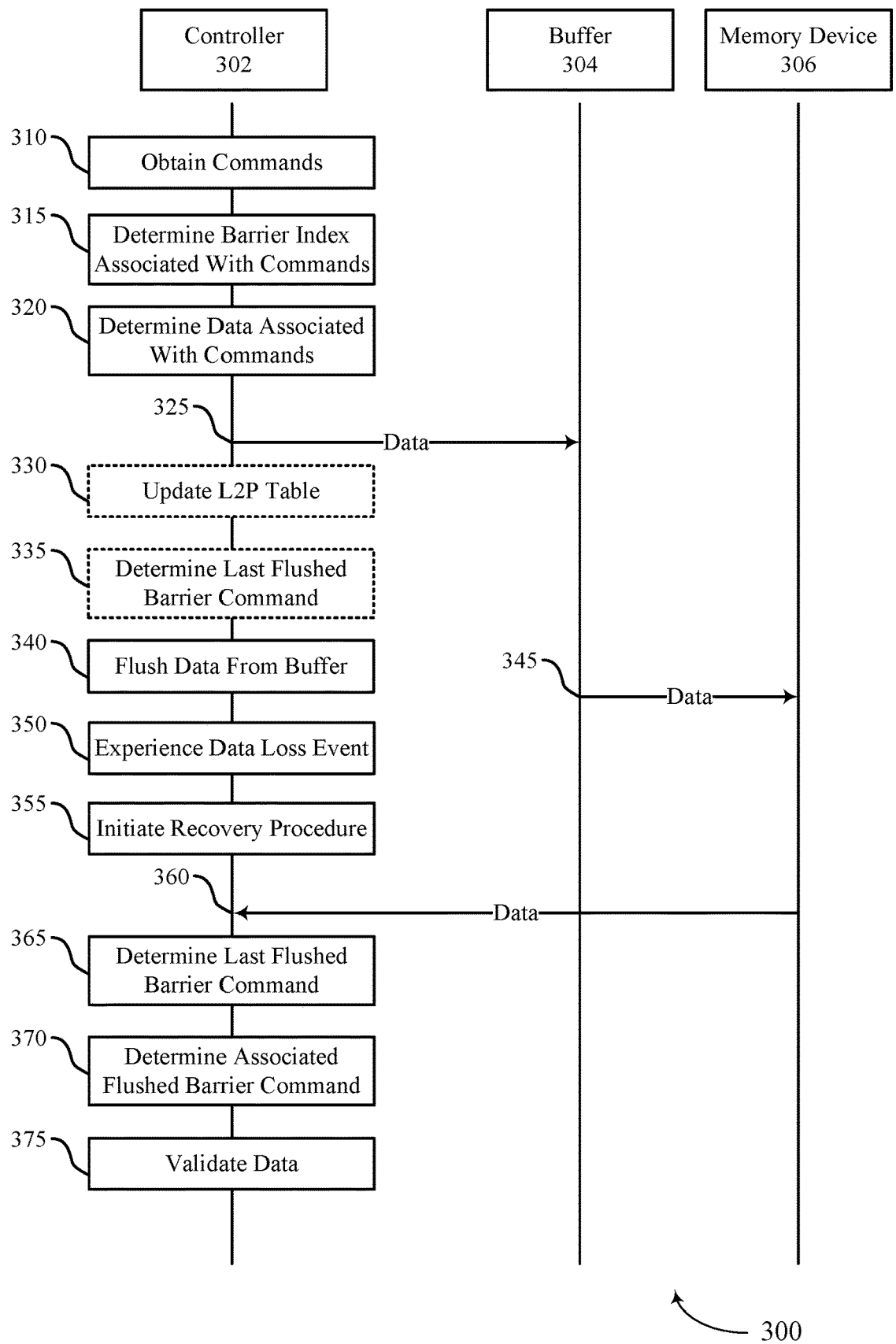
FIG. 3 illustrates an example of a set of operations for data recovery using barrier commands in accordance with examples as disclosed herein.

FIG. 3 illustrates an example of a set of operations for data recovery using barrier commands in accordance with examples as disclosed herein.

Process flow 300 may be performed by controller 302, which may be an example of or within a host system controller or memory system controller described herein. Process flow 300 may also be performed by buffer 304 or memory device 306, which may be respective examples of a buffer and memory device described herein. Buffer 304 may include multiple buffers—e.g., a first buffer for single-level data and a second buffer for multi-level data. In some examples, one or more different components may perform different operations than as depicted, such as the buffer 304 or the memory device 306 performing operations otherwise shown as being performed by controller 302.

In some examples, process flow 300 illustrates an example set of operations performed to support data recovery using barrier commands. For example, process flow 300 may include operations for associating data with barrier command, maintaining an indication of a last barrier command for which all of the associated data has been flushed (which may be referred to as the last flushed barrier command), and using the associated barrier commands and last flushed barrier command for data recovery after a data loss event.

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by a controller (e.g., controller 302), may cause the controller to perform the operations of the process flow 300.

One or more of the operations described in process flow 300 may be performed earlier or later, omitted, replaced, supplemented, or combined with another operation. Also, additional operations described herein may replace, supplement or be combined with one or more of the operations described in process flow 300.

At 310, a set of commands may be obtained at controller 302. The set of commands may include access commands and barrier commands. The access commands may include programming commands, read commands, remapping commands, and unmapping commands. In some examples, the access commands include single-level access commands and multi-level access commands. Controller 302 may receive the commands from a host system. In some examples, the commands may be generated at controller 302—e.g., if controller 302 is located at a host system. In some examples, the commands may include logical address and correspond to sets of data to be written to a memory system.

At 315, a barrier index associated with the obtained commands may be determined. In some examples, controller 302 determines the barrier index associated with the commands based on a position of the commands relative to obtained barrier commands. For example, controller 302 may determine that a first set of commands are associated with a first barrier command based on the first set of commands occurring prior to the first barrier command, a second set of commands are associated with a second barrier command based on the second set of commands occurring after the first barrier command and before the second barrier command and so on.

At 320, controller 302 may identify data associated with the obtained commands. Controller 302 may identify, for example, sets of data corresponding to respective commands of the obtained commands. In some examples, controller 302 determines that sets of data are associated with first characteristics (e.g., single-level operations, hot data, sequential data, metadata, database data, etc.) and other sets of data are associated with second characteristics (e.g., multi-level operations, cold data, random data, application data, media data, etc.). For example, controller 302 may determine that a set of data is associated with single-level operations if a logical address associated with the set of data corresponds to a single-level virtual block or is associated with a single-level command. Controller 302 may also determine that another set of data is associated with multi-level operations if a logical address associated with the other set of data corresponds to a multi-level virtual block or is associated with a multi-level command.

At 325, the sets of data may be written to buffer 304. In some examples, buffer 304 may include one or more buffers. In some examples, controller 302 writes sets of data associated with single-level storage techniques to a first buffer of buffer 304 (which may be referred to as buffer1) and sets of data associated with multi-level storage techniques to a second buffer of buffer 304 (which may be referred to as buffer2). Controller 302 may write the sets of data to buffer 304 in a same order in which the corresponding commands were obtained. Alternatively, controller 302 may write the sets of data to buffer 304 in a different order than an order in which the corresponding commands were obtained. Controller 302 may write, with the sets of data, an indication of the barrier commands associated with the sets of data (e.g., as metadata). In some examples, controller 302 may also write, with the sets of data, an indication of a last flushed barrier command at the time the sets of data are written to the buffer.

At 330, information, such as an L2P table, that indicates a mapping between logical addresses and physical addresses within a memory system may be updated. In some examples, controller 302 updates (or initiates the update of) the L2P table after writing the sets of data to buffer 304. In other examples, controller 302 updates (or initiates the update of) the L2P table when the sets of data are transferred from buffer 304 to memory device 306. In yet other examples, controller 302 updates (or initiates the update of) the L2P table after the sets of data are successfully written to a physical location of memory device 306.

At 335, a last flushed barrier command may be determined based on determining a set of data to be flushed in a subsequent flushing operations from buffer 304. In some examples, controller 302 determines the last flushed barrier command based on or in response to scheduling a flushing operation from the buffers at buffer 304. For example, prior to a flushing operation, controller 302 may identify the barrier commands associated with the sets of data to be flushed and determine whether there are any remaining sets of data to be flushed for the barrier commands apart from the sets of data to be flushed. If there are no remaining sets of data to be flushed for a barrier command and there are no preceding barrier commands for which data remains to be flushed, controller 302 may determine that the barrier command is the last flushed barrier command. In some examples, controller 302 stores the indication of the last flushed barrier command (e.g., an index of the last flushed barrier command) in nonvolatile memory. Additionally, controller 305 may update metadata of the sets of data to be flushed to indicate the last flushed barrier command—e.g., controller 305 may update a metadata field in each of the sets of data to indicate the last flushed barrier command prior to performing the flushing operation.

In some examples, controller 302 may designate each barrier command as a node and create a list of the commands associated with each node. Controller 302 may further order the nodes so that the earliest received node is positioned at a beginning of the nodes. Each time a command is executed, controller 302 may remove the command from a respective list. Once all of the commands in a list have been removed, controller 302 may remove the node associated with the list. Accordingly, as nodes are removed, controller 302 may determine that the barrier command associated with the first node of the nodes is the last flushed barrier command.

Figure 5:
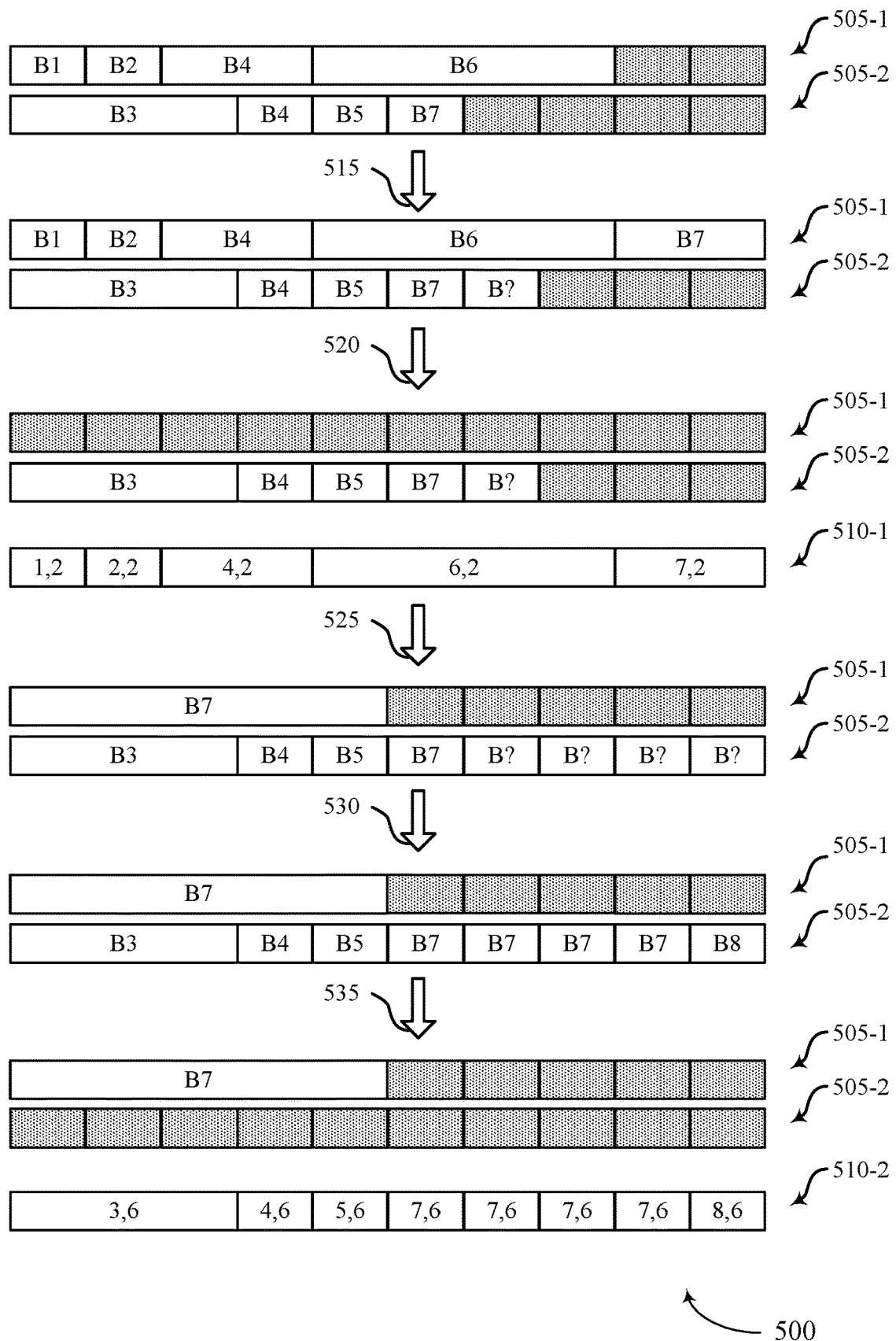
FIG. 5 illustrates an example of an operational diagram for data recovery using barrier commands in accordance with examples as disclosed herein.

In some examples, controller 302 may determine the last flushed barrier command based on the barrier commands associated with the sets of data stored in the buffers of buffer 304, as described in more detail herein and with reference to FIG. 5.

At 340, data may be flushed from buffer 304—e.g., the sets of data for which the metadata has been updated. In some examples, controller 302 initiates a series of flush operations to move data from buffer 304 to memory device 306. In some examples, controller 302 initiate a first set of flush operations to move data from a first buffer of buffer 304 to memory device 306 (e.g., to single-level virtual blocks) and a second set of flush operations to move data from a second buffer of buffer 304 to memory device 306 (e.g., to multi-level virtual blocks). In some examples, the performance of the first set of flush operations and the second set of flush operations may be intermixed with one another—e.g., performed in an alternating pattern.

At 345, the sets of data may be transferred from buffer 304 to memory device 306. In some examples, the sets of data are transferred to memory device as part of flushing operations performed by controller 302. The sets of data may be transferred to memory device 306 in an order that is different than the order with which the sets of data were written to buffer 304. For example, sets of data that were stored in buffer 304 after other sets of data may be written to memory device 306 before the other sets of data. In some examples, the order for transferring the sets of data to memory device 306 is selected to increase a performance of a memory system, where certain sets of data may be transferred at certain times to decrease power consumption, increase bandwidth, etc.

An indication of the barrier command associated with the sets of data may be transferred with the sets of data. In some examples, an indication of the last flushed barrier command (e.g., in a corresponding metadata field) associated with the sets of data at the time of the transfer may also be transferred with the set of data. In some examples, the sets of data are stored in pages of a virtual block, where each page can be used to store a set of data and metadata for the set of data. The metadata may include an index of the barrier command associated with the set of data and, in some examples, an index of the last flushed barrier command at a time immediately prior to flushing the set of data to memory device 306.

At 350, a data loss event may occur at controller 302. The data loss event may include or be based on an asynchronous power loss, a power surge, interference, etc., that is detectable by controller 302. As a result of the data loss event, at least some data stored in buffer 304 may be lost.

At 355, a recovery procedure may be initiated. As part of the recovery procedure, controller 302 may determine whether sets of data that were stored in buffer 304 around the time of the data loss event (e.g., up to a threshold duration before the data loss event, after a latest checkpoint) were successfully transferred to memory device 306 prior to the occurrence of the data loss event. As part of the recovery procedure, controller 302 may read data stored in memory device 306 (based on a latest version of an L2P table) to determine whether the data stored at locations of the memory device should be retained or discarded. In some examples, controller 302 identifies the physical addresses of memory device 306 to read based on a previous version of the L2P table that was stored at a checkpoint—e.g., based on differences between the previous and latest versions of the L2P table. In some examples, controller 302 may discard sets of data that were written to memory device 306 based on or in response to determining that precedent sets of data (e.g., sets of data stored in buffer 304 prior to the written sets of data) were not written to memory device 306. In some examples, controller 302 may discard sets of data that were written to memory device 306 based on or in response to determining that other sets of data associated with a same barrier command as the written sets of data were not written to memory device 306.

At 360, one or more sets of data may be read from memory device 306. In some examples, controller 302 reads memory cells stored at physical locations of memory device 306 that were written with data after a checkpoint. Controller 302 may also read, with the sets of data, indications of barrier commands associated with the sets of data and, in some examples, indications of a last flushed barrier command associated with storing the sets of data—e.g., based on or in response to reading metadata stored with the sets of data.

At 365, a last flushed barrier command may be determined. In some examples, controller 302 determines the last flushed barrier command based on an indication of the last flushed barrier command (e.g., an index of the last flushed barrier command) stored in nonvolatile memory. In some examples, controller 302 determines the last flushed barrier command based on the indications of the last flushed barrier command stored with the data (e.g., as metadata) read from memory device 306—e.g., controller 302 may determine the last flushed barrier command based on the highest last flushed barrier command index obtained with the read sets of data.

At 370, barrier commands associated with the sets of data read from memory device 306 may be determined. Controller 302 may determine the barrier commands associated with the sets of data based on corresponding metadata read with the sets of data. In some examples, controller 302 may determine an index of a barrier command associated with each of the sets of data.

At 375, the sets of data read from memory device 306 may be validated. In some examples, validating the data may include determining that the data is valid and should be retained or that the data is invalid and should be discarded. To validate the sets of data, controller 302 may, for each of the sets of data read from memory device 306, compare a barrier command index associated with a set of data against an index of the determined last flushed barrier command. If the barrier command index associated with the set of data is less than or equal to the determined last flushed barrier command, the controller 302 may retain the set of data. Otherwise, if the barrier command index is greater than the determined last flushed barrier command, the controller 302 may discard the set of data.

Figure 4A:
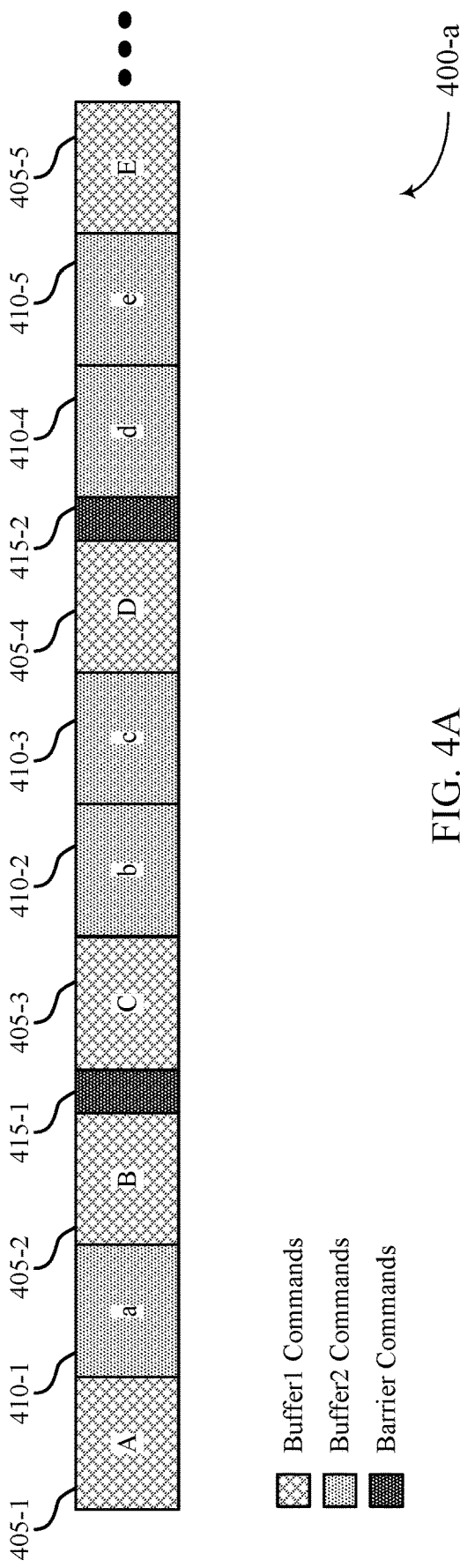
FIGS. 4A and 4B illustrate example operational diagrams for data recovery using barrier commands in accordance with examples as disclosed herein.

FIG. 4A illustrates an example of an operational diagram that supports data recovery using barrier commands in accordance with examples as disclosed herein.

Operational diagram 400-*a* depicts a set of commands received at a memory system, including buffer1 commands 405 that are associated with a first buffer (which may also be referred to as a first cursor or buffer1), buffer2 commands 410 that are associated with a second buffer (which may also be referred to as a second cursor or buffer2), and barrier commands 415. The buffer1 commands 405 and buffer2 commands 410 may be programming commands, remapping commands, other commands, or any combination thereof. In some examples, an increased or decreased quantity of commands may be included between the barrier commands 415 (e.g., a different quantity of commands may be included between two barrier commands 415 compared to a quantity of commands between two other barrier commands 415).

Buffer1 commands 405 may be associated with a first buffer at a memory system. In some examples, buffer1 commands 405 may be used to access (e.g., read from or write to) a memory device in accordance with single-level operations. The data accessed using buffer1 commands 405 may be stored in single-level virtual blocks at the memory device. Buffer2 commands 410 may be associated with a second buffer at a memory system. In some examples, buffer2 commands 410 may be used to access (e.g., read from or write to) a memory device in accordance with multi-level access operations. The data accessed using buffer2 commands 410 may be stored in multi-level virtual blocks at the memory device.

Each of the buffer commands may be associated with one of the barrier commands 415. For example, first buffer1 command 405-1, second buffer1 command 405-2, and first buffer2 command 410-1 may be associated with first barrier command 415-1. Third buffer1 command 405-3, fourth buffer1 command 405-4, second buffer2 command 410-2, and third buffer2 command 410-3 may be associated with second barrier command 415-2. And fourth buffer2 command 410-4, fifth buffer2 command 410-5, and fifth buffer1 command 405-5 may be associated with a subsequent barrier command. Each of the buffer commands may also be associated with different sets of data that may be stored in respective buffers—e.g., the sets of data associated with buffer1 commands 405 may be stored in buffer1 and the sets of data associated with buffer2 commands 410 may be stored in buffer2.

When a memory system stores a set of data in a buffer, the memory device, or both, the memory system may store an indication of the barrier command associated with the set of data. For example, when storing, in buffer1, a set of data corresponding to first buffer1 command 405-1, the memory system may store an indication that the set of data is associated with first barrier command 415-1. Similarly, when storing, in buffer2, a set of data corresponding to first buffer2 command 410-1, the memory system may store an indication that the set of data is associated with first barrier command 415-1. Additionally, the memory system may store an indication that the set of data corresponding to third buffer1 command 405-3 is associated with second barrier command 415-2. And so on.

Figure 4B:
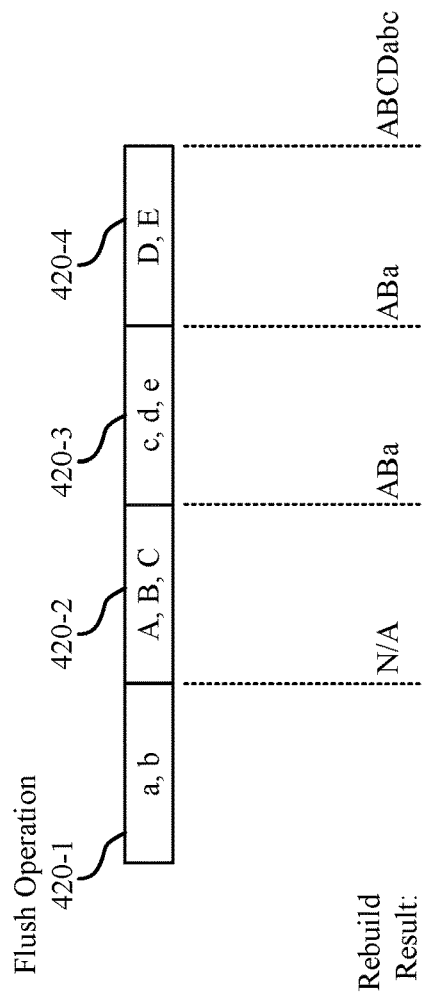

FIG. 4B illustrates an example of an operational diagram for data recovery using barrier commands in accordance with examples as disclosed herein.

Operational diagram 400-*b* depicts a set of flush operations 420 executed by a memory system. The flush operations 420 may be used to transfer data corresponding to the buffer1 commands 405 and buffer2 command 410 from respective buffers to a memory device. In some examples, the data in buffer1 and buffer2 may be independently flushed in an order that is based the barrier commands. For example, for buffer1, all of the data associated with first barrier command 415-1 may be flushed before any data associated with the subsequent barrier commands. Similarly, for buffer2, all of the data associated with first barrier command 415-1 may be flushed before any data associated with the subsequent barrier commands. That said, data in buffer1 that is associated with second barrier command 415-2 may be flushed before all of the data in buffer2 that is associated with first barrier command 415-1 is flushed.

When executing first flush operation 420-1, a memory system may write sets of data associated with first buffer2 command 410-1 (which may be represented as a(1,0)) and second buffer2 command 410-2 (which may be represented as b(2,0)) to the memory device. For the sets of data, the first value within the parentheses may indicate an index of the barrier command associated with a set of data and the second value may indicate an index of the last flushed barrier command—e.g., a(1,0) may represent that the corresponding data is associated with first barrier command 415-1 and that a 0th barrier command is the last flushed barrier command (which may indicate that all the data belonging to commands associated with a 0th barrier command have been flushed or that no barrier command has been received since the occurrence of a last checkpoint).

The memory system may also determine whether all of the data associated with a barrier command are to be flushed based on (e.g., prior to) executing first flush operation 420-1. In some examples, the memory system makes the determination prior to first flush operation 420-1 or as part of first flush operation 420-1 (but prior to transferring data from the buffer to the memory device). Based on (e.g., prior to or at a beginning of) performing first flush operation 420-1, the memory system may determine that there is remaining data to be flushed for a current barrier command (e.g., first barrier command 415-1) and, thus, may maintain the value of the last flushed index.

Similarly, when executing second flush operation 420-2, the memory system may write sets of data associated with first buffer1 command 405-1 (which may be represented as A (1,1)), second buffer1 command 405-2 (which may be represented as B (1,1)), and third buffer1 command 405-3 (which may be represented as C (2,1)). Based on (e.g., prior to or at a beginning of) executing second flush operation 420-2, the memory system may update the last flushed index based on (e.g., in response) to determining that all of the sets of data (e.g., A, a, and B) associated with first barrier command 415-1 are to be flushed. Particularly, the memory system may update the last flushed index to reflect the index of first barrier command 415-1.

Similarly, when executing third flush operation 420-3, the memory system may write sets of data associated with third buffer2 command 410-1 (which may be represented as c(2,1)), fourth buffer2 command 405-4 (which may be represented as d(3,1)), and fifth buffer2 command 405-5 (which may be represented as e(3,1)). Based on (e.g., prior to or at a beginning of) executing the third flush operation 420-3, the memory system may maintain the last flushed index—e.g., because the data associated with fourth buffer1 command 405-4 may not yet be scheduled for flushing by third flush operation 420-3.

And similarly, when executing fourth flush operation 420-4, the memory system may write sets of data associated with fourth buffer1 command 405-4 (which may be represented as D (2,2)), and fifth buffer1 command 405-5 (which may be represented as E (3,2)). Based on (e.g., prior to or at a beginning of) executing fourth flush operation 420-4, the memory system may update the last flushed index to reflect the index of second barrier command 415-2.

In case of a data loss event, a memory system may perform a recovery process that uses the barrier-related indices to determine whether to maintain or discard data flushed to a memory device. FIG. 4B depicts the result of the recovery process as the flush operations 420 are completed, where the dotted lines depict a completion of respective flush operations. For example, if the data loss event occurs after a completion of first flush operation 420-1, the memory system may fail to recover any of the flushed data. Particularly, during the recovery operation, the memory system may read the sets of data (a(1,0) & b(2,0)) from a memory device along with the associated barrier indices. The memory system may further compare the barrier indices with a last flushed index (which may be stored in non-volatile memory or obtained from other sets of data stored in the memory device) and determine that the barrier indices associated with the sets of data exceed the last flushed index.

If the data loss event occurs after a completion of second flush operation 420-2, the memory system may recover a portion of the sets of data written to one or more memory devices. Particularly, the memory system may compare the barrier indices associated with the set of data (a(1,1), b(2,1), A (1,1), B (1,1), and C (2,1)) with the last flushed index (which may be associated with first barrier command 415-1 and represented by the value one (1)) and determine that the sets of data associated with first barrier command 415-1 (a, A, & B) are recoverable. The memory system may obtain the last flushed index from non-volatile memory or from metadata stored the sets of data flushed during the execution of first flush operation 420-1.

In some examples, the data loss event may occur during the execution of second flush operation 420-2. In such cases, the memory system may use the barrier indices to recover the set of data associated with buffer2 (a(1,1)) based on or in response to identifying a second set of data associated with buffer2 (b(2,1)) that is associated with a subsequent barrier command. The memory system may discard the sets of data associated with buffer1 (e.g., A (1,1) and B (1,1))— e.g., because the memory system may be unable to determine which barrier command the lost data of buffer1 was associated with.

If the data loss event occurs after a completion of third flush operation 420-3, the memory system may recover the same portion as after the completion of second flush operation 420-2—e.g., because all of the data associated with second barrier command may not yet be written. If the data loss event occurs after a completion of fourth flush operation 420-4, the memory system may recover the data associated with first barrier command 415-1 and second barrier command 415-2 (e.g., a(1,2), b(2,2), c(2,2), A (1,2), B (1,2) & C (2,2))— e.g., based on the last flushed index being associated with second barrier command 415-2 and represented by the value two (2).

In some examples, instead of storing the last flushed index, a memory system may use the barrier indices stored with the sets of data to determine the last flushed index as described in more detail herein and with reference to FIG. 5.

FIG. 5 illustrates an example of an operational diagram that supports data recovery using barrier commands in accordance with examples as disclosed herein.

Operational diagram 500 depicts volatile buffers 505 used to store data before the data is transferred to one or more non-volatile memory devices. Operational diagram 500 further depicts flushing operations as well as aspects of an example technique for managing barrier command information associated with the flushing operations. As described herein, data stored in the volatile buffers 505 may be chronologically ordered in accordance with the sequence of barriers, which may simplify the tracking of a last flushed barrier. In some examples, the correspondence between data and barriers can be tracked with different and dedicated data structures.

Operational diagram 500, for example, begins with respective sets of data associated with a first, second fourth, and sixth barrier command (B1, B2, B4, and B6) in first buffer 505-1 and respective sets of data associated with a third, fourth, fifth, and seventh barrier command (B3, B4, B5, and B7) in second buffer 505-2. The greyed-out portions of first buffer 505-1 and second buffer 505-2 may represent unused portions of the buffers 505. As depicted in operational diagram 500, sets of data for a barrier command may be written in one or both of first buffer 505-1 and second buffer 505-2. As also depicted in operational diagram 500, once a controller begins writing data for a particular barrier command to the buffers 505, no additional data for prior barrier commands may be written to the buffers 505.

At 515, an additional set of data may be added to second buffer 505-2. In some examples, the barrier command associated with the set of data may be unknown and may be represented as "B?."

At 520, a flushing operation may be initiated for first buffer 505-1 and all of the data in first buffer 505-1 may be transferred to a memory device. After completing the flushing operation, at least some if not all of the entries in first buffer 505-1 may be unused. In some examples, the association between the set of data and the unknown barrier command may not be determined—e.g., because the flushing operation is for first buffer 505-1 and only the barrier command associated with the first set of data stored in second buffer 505-2 need be known. In some examples, if the association between the first entry of second buffer 505-2 and a barrier command is not known (e.g., has not been determined), the association may be determined as part of the flushing operation.

As part of the flushing operation (e.g., at a beginning of the flushing operation before data is transfer from first buffer 505-1), the barrier commands associated with each set of data to be flushed may be determined (e.g., based on mapping information stored by the controller, metadata stored with the sets of data, etc.) and the last flushed barrier command may be determined. To determine the last flushed barrier command, a minimum of an index of the barrier command associated with the last set of data stored in the buffer to be flushed (e.g., B7 of first buffer 505-1) and one less than the index of the barrier command associated with the first set of data stored in the other buffer (e.g., B3) may be used. At 520, the index of the last flushed barrier command may be equal to min(7, 3−1), which may be equal to two (2).

The determined indices of the barrier commands associated with sets of data being flushed from first buffer 505-1 may be stored in first flushing buffer 510-1. For example, the first entry in first flushing buffer 510-1 (which may correspond to the first entry of and first set of data stored in first buffer 505-1) may store the index of the first barrier command (B1), the second entry in first flushing buffer 510-1 may store the index of the second barrier command (B2), the third entry in first flushing buffer 510-1 may store the index of the fourth barrier command (B4), and so on. All of the entries in first flushing buffer 510-1 may also store the index of the last flushed barrier command (e.g., B2). In some examples, the data stored in first flushing buffer 510-1 may be stored in a memory device with the corresponding sets of data (e.g., as metadata).

At 525, additional data may be written to the buffers. In some examples, sets of data that are associated with an unknown barrier command may be written to second buffer 505-2. In some examples, sets of data that are associated with an unknown barrier command may be written to another location.

At 530, a flushing operation may be initiated. Thus, the association between the sets of data and the unknown barrier commands may be determined—e.g., to determine the index of the last barrier command in second buffer 505-2.

At 535, after identifying the association between the sets of data and the unknown barrier commands, all of the data in second buffer 505-2 may be transferred to the memory device. Also, prior to the flushing operation or at a beginning of the flushing operation prior to transferring data from second buffer 505-2, the barrier commands associated with each set of flushed data may be determined and the last flushed barrier command may be determined as similarly described with reference to 525. At 535, the index of the last flushed barrier command may be equal to min(8, 7−1), which may be equal to 6.

As similarly described at 520, the determined indices of the barrier commands associated with sets of data being flushed from second buffer 505-2 and the index of the last flushed barrier command may be stored in second flushing buffer 510-2. In some examples, the data stored in second flushing buffer 510-2 may be stored in the memory device with the corresponding sets of data (e.g., as metadata).

During a recovery operation, a controller may use the barrier command indices associated with data read from the memory device and the last flushed indices to determine whether to retain or discard data as described herein and with reference to FIG. 3.

Figure 6:
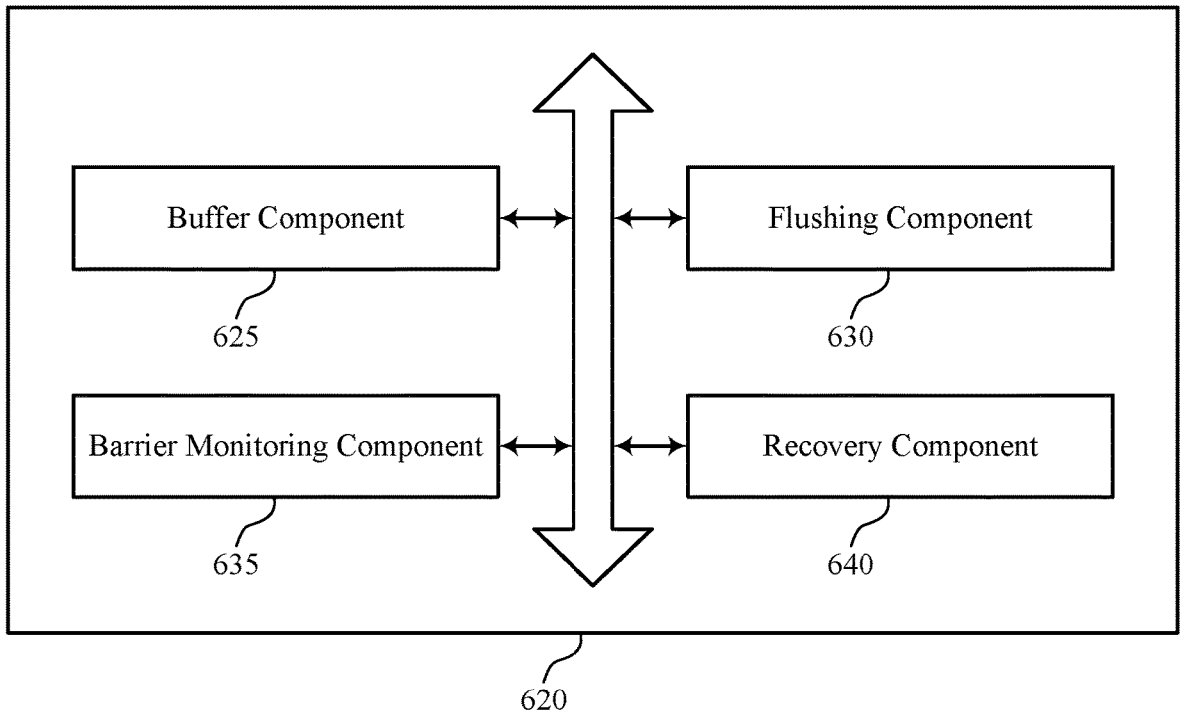
FIG. 6 shows a block diagram of a memory system that supports data recovery using barrier commands in accordance with examples as disclosed herein.

FIG. 6 shows a block diagram 600 of a memory system 620 that supports data recovery using barrier commands in accordance with examples as disclosed herein. The memory system 620 may be an example of aspects of a memory system as described with reference to FIGS. 2 through 6. The memory system 620, or various components thereof, may be an example of means for performing various aspects of data recovery using barrier commands as described herein. For example, the memory system 620 may include a buffer component 625, a flushing component 630, a barrier monitoring component 635, a recovery component 640, or any combination thereof. Each of these components may communicate, directly or indirectly, with one another (e.g., via one or more buses).

The buffer component 625 may be configured as or otherwise support a means for writing, to a buffer, data for a set of commands that is associated with a barrier command. The barrier monitoring component 635 may be configured as or otherwise support a means for determining, based at least in part on a portion of the data to be flushed from the buffer, whether to update an indication of a last barrier command for which all of the associated data has been written to a memory device. The flushing component 630 may be configured as or otherwise support a means for performing a flushing operation based at least in part on determining whether to update the indication of the last barrier command, the flushing operation comprising transferring the portion of the data from the buffer to the memory device. The recovery component 640 may be configured as or otherwise support a means for validating, during a recovery operation, the portion of the data stored in the memory device based at least in part on determining the barrier command is associated with the portion of the data and on updating the indication of the last barrier command to indicate the barrier command.

In some examples, the flushing component 630 may be configured as or otherwise support a means for storing, based at least in part on the flushing operation, an index of the barrier command with the portion of the data, where the indication includes the index of the barrier command.

In some examples, the buffer component 625 may be configured as or otherwise support a means for writing, to the buffer, second data associated with a second set of commands that is associated with a second barrier command. In some examples, the flushing component 630 may be configured as or otherwise support a means for writing, from the buffer to the memory device as part of the flushing operation, a portion of the second data. In some examples, the flushing component 630 may be configured as or otherwise support a means for storing, based at least in part on the flushing operation, an index of the second barrier command with the portion of the second data.

In some examples, the flushing component 630 may be configured as or otherwise support a means for writing, from the buffer to the memory device as part of a second flushing operation, a second portion of the data. In some examples, the flushing component 630 may be configured as or otherwise support a means for storing, based at least in part on the second flushing operation, an index of the barrier command with the second portion of the data.

In some examples, the barrier monitoring component 635 may be configured as or otherwise support a means for maintaining, based at least in part on the flushing operation, a state of the indication of the last barrier command based at least in part on determining that less than all of the data associated with the barrier command has been written to the memory device. In some examples, the barrier monitoring component 635 may be configured as or otherwise support a means for updating, based at least in part on the second flushing operation, the indication of the last barrier command to indicate the barrier command.

In some examples, the recovery component 640 may be configured as or otherwise support a means for performing the recovery operation after the second flushing operation, where the portion of the data and the second portion of the data are validated during the recovery operation based at least in part on updating the indication of the last barrier command.

In some examples, to support determining whether to update the indication of the last barrier command to indicate the barrier command, the barrier monitoring component 635 may be configured as or otherwise support a means for determining whether all of the data associated with the barrier command is to be written to the memory device.

In some examples, the barrier monitoring component 635 may be configured as or otherwise support a means for updating the indication of the last barrier command to indicate the barrier command based at least in part on determining that all of the data associated with the barrier command has been written to the memory device.

In some examples, to support validating the portion of the data stored in the memory device, the recovery component 640 may be configured as or otherwise support a means for determining that the barrier command is associated with the portion of the data based at least in part on an index of the barrier command stored with the portion of the data. In some examples, to support validating the portion of the data stored in the memory device, the recovery component 640 may be configured as or otherwise support a means for determining an index of the last barrier command based at least in part on the indication of the last barrier command. In some examples, to support validating the portion of the data stored in the memory device, the recovery component 640 may be configured as or otherwise support a means for determining that the index of the barrier command is less than or equal to the index of the last barrier command, where the portion of the data is validated based at least in part on the index of the barrier command associated with the portion of the data being less than or equal to the index of the barrier command.

In some examples, None, and the flushing component 630 may be configured as or otherwise support a means for writing a second portion of the data to the second buffer as part of a second flushing operation.

In some examples, the barrier monitoring component 635 may be configured as or otherwise support a means for maintaining, based at least in part on the flushing operation, a state of the indication of the last barrier command based at least in part on determining that less than all of the data associated with the barrier command has been written to the memory device. In some examples, the barrier monitoring component 635 may be configured as or otherwise support a means for updating, based at least in part on the second flushing operation, the indication of the last barrier command to indicate the barrier command.

In some examples, the recovery component 640 may be configured as or otherwise support a means for performing the recovery operation after the second flushing operation, where the portion of the data and the second portion of the data are validated during the recovery operation based at least in part on updating the indication of the last barrier command.

In some examples, the recovery operation occurs after the flushing operation.

In some examples, the buffer includes a first buffer associated with single-level operations and a second buffer associated with multi-level operations, and the buffer component 625 may be configured as or otherwise support a means for writing, to the second buffer, second data for a second set of commands that is associated with a second barrier command and, to the first buffer, third data for a third set of commands that is associated with a third barrier command. In some examples, the buffer includes a first buffer associated with single-level operations and a second buffer associated with multi-level operations, and the flushing component 630 may be configured as or otherwise support a means for performing the flushing operation for the first buffer, where the portion of the data and a portion of the third data are written to the memory device based at least in part on performing the flushing operation. In some examples, the buffer includes a first buffer associated with single-level operations and a second buffer associated with multi-level operations, and the barrier monitoring component 635 may be configured as or otherwise support a means for obtaining an index of the third barrier command based at least in part on the third data being flushed from the first buffer at an end of the flushing operation.

In some examples, the buffer includes data that is to be flushed to different (e.g., two or more) virtual blocks, where the virtual blocks may have different characteristics—e.g., one virtual block may be associated with single-level programming operations and another virtual block may be associated with multi-level programming operations. In some examples, the virtual blocks are dedicated to data having certain characteristics. For example, the virtual blocks may be associated with data for different logic units. In some examples, the virtual blocks may be associated with different data having different stream identifiers—e.g., one virtual block may be associated with hot data and the other virtual block may be associated with cold data, one virtual block may be associated with sequential data and the other virtual block may be associated with random data, one virtual block may be associated with metadata data and the other virtual block may be associated with application data, one virtual block may be associated with multi-media content, one virtual block may be associated with database files, etc.

In some examples, the barrier monitoring component 635 may be configured as or otherwise support a means for obtaining, based at least in part on performing the flushing operation, an index of the second barrier command based at least in part on an initial entry of the second buffer storing the second data. In some examples, the barrier monitoring component 635 may be configured as or otherwise support a means for determining the indication of the last barrier command based at least in part on a difference between the index of the third barrier command and the index of the second barrier command, where validating the portion of the data stored in the memory device is based at least in part on determining the indication of the last barrier command.

Figure 7:
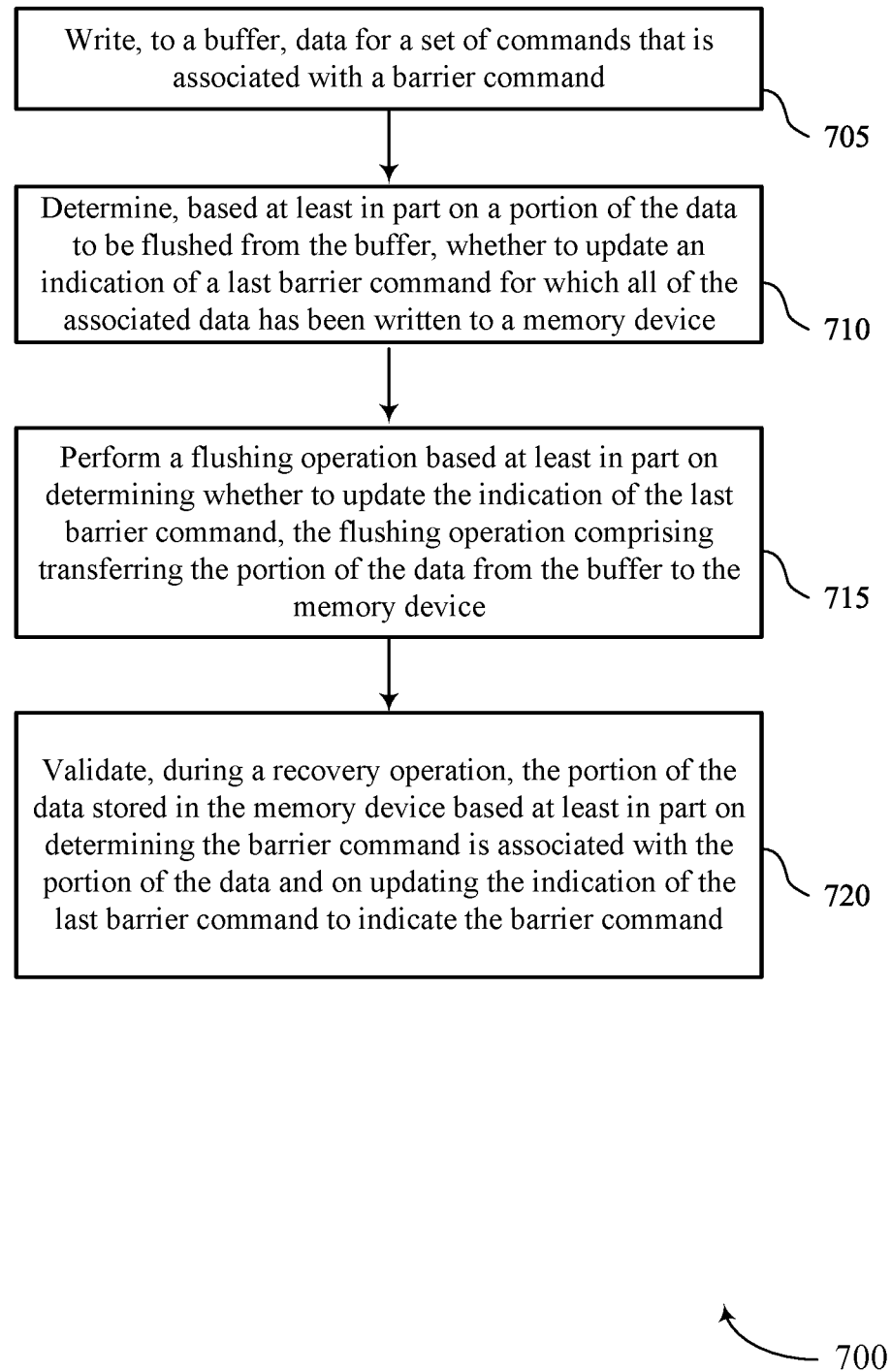
FIG. 7 shows a flowchart illustrating a method or methods that support data recovery using barrier commands in accordance with examples as disclosed herein.

FIG. 7 shows a flowchart illustrating a method 700 that supports data recovery using barrier commands in accordance with examples as disclosed herein. The operations of method 700 may be implemented by a memory system or its components as described herein. For example, the operations of method 700 may be performed by a memory system as described with reference to FIGS. 2 through 6. In some examples, a memory system may execute a set of instructions to control the functional elements of the device to perform the described functions. Additionally, or alternatively, the memory system may perform aspects of the described functions using special-purpose hardware.

At 705, the method may include writing, to a buffer, data for a set of commands that is associated with a barrier command. The operations of 705 may be performed in accordance with examples as disclosed herein. In some examples, aspects of the operations of 705 may be performed by a buffer component 625 as described with reference to FIG. 6.

At 710, the method may include determining, based at least in part on a portion of the data to be flushed from the buffer, whether to update an indication of a last barrier command for which all of the associated data has been written to a memory device. The operations of 710 may be performed in accordance with examples as disclosed herein. In some examples, aspects of the operations of 710 may be performed by a barrier monitoring component 635 as described with reference to FIG. 6.

At 715, the method may include performing a flushing operation based at least in part on determining whether to update the indication of the last barrier command, the flushing operation comprising transferring the portion of the data from the buffer to the memory device. The operations of 715 may be performed in accordance with examples as disclosed herein. In some examples, aspects of the operations of 715 may be performed by a flushing component 630 as described with reference to FIG. 6.

At 720, the method may include validating, during a recovery operation, the portion of the data stored in the memory device based at least in part on determining the barrier command is associated with the portion of the data and on updating the indication of the last barrier command to indicate the barrier command. The operations of 720 may be performed in accordance with examples as disclosed herein. In some examples, aspects of the operations of 720 may be performed by a recovery component 640 as described with reference to FIG. 6.

In some examples, an apparatus or electronic device as described herein may perform a method or methods, such as the method 700. The apparatus or electronic device may include, features, circuitry, logic, means, or instructions (e.g., a non-transitory, computer-readable medium storing instructions executable by a processor), or any combination thereof for performing the following aspects of the present disclosure:

Aspect 1: The apparatus, including features, circuitry, logic, means, or instructions, or any combination thereof for writing, to a buffer, data for a set of commands that is associated wuith a barrier command; determining, based at least in part on a portion of the data to be flushed from the buffer, whether to update an indication of a last barrier command for which all of the associated data has been written to a memory device; performing a flushing operation based at least in part on determining whether to update the indication of the last barrier command, the flushing operation comprising transferring the portion of the data from the buffer to the memory device; and validating, during a recovery operation, the portion of the data stored in the memory device based at least in part on determining the barrier command is associated with the portion of the data and on updating the indication of the last barrier command to indicate the barrier command Aspect 2: The apparatus of aspect 1, further including operations, features, circuitry, logic, means, or instructions, or any combination thereof for storing, based at least in part on the flushing operation, an index of the barrier command with the portion of the data, where the indication includes the index of the barrier command.

Aspect 3: The apparatus of any of aspects 1 through 2, further including operations, features, circuitry, logic, means, or instructions, or any combination thereof for writing, to the buffer, second data associated with a second set of commands that is associated with a second barrier command; writing, from the buffer to the memory device as part of the flushing operation, a portion of the second data; and storing, based at least in part on the flushing operation, an index of the second barrier command with the portion of the second data.

Aspect 4: The apparatus of any of aspects 1 through 3, further including operations, features, circuitry, logic, means, or instructions, or any combination thereof for writing, from the buffer to the memory device as part of a second flushing operation, a second portion of the data and storing, based at least in part on the second flushing operation, an index of the barrier command with the second portion of the data.

Aspect 5: The apparatus of aspect 4, further including operations, features, circuitry, logic, means, or instructions, or any combination thereof for maintaining, based at least in part on the flushing operation, a state of the indication of the last barrier command based at least in part on determining that less than all of the data associated with the barrier command has been written to the memory device and updating, based at least in part on the second flushing operation, the indication of the last barrier command to indicate the barrier command.

Aspect 6: The apparatus of aspect 5, further including operations, features, circuitry, logic, means, or instructions, or any combination thereof for performing the recovery operation after the second flushing operation, where the portion of the data and the second portion of the data are validated during the recovery operation based at least in part on updating the indication of the last barrier command.

Aspect 7: The apparatus of any of aspects 1 through 6 where determining whether to update the indication of the last barrier command to indicate the barrier command, further includes operations, features, circuitry, logic, means, or instructions, or any combination thereof for determining whether all of the data associated with the barrier command is to be written to the memory device.

Aspect 8: The apparatus of any of aspects 1 through 7, further including operations, features, circuitry, logic, means, or instructions, or any combination thereof for updating the indication of the last barrier command to indicate the barrier command based at least in part on determining that all of the data associated with the barrier command has been written to the memory device.

Aspect 9: The apparatus of any of aspects 1 through 8 where validating the portion of the data stored in the memory device, further includes operations, features, circuitry, logic, means, or instructions, or any combination thereof for determining that the barrier command is associated with the portion of the data based at least in part on an index of the barrier command stored with the portion of the data; determining an index of the last barrier command based at least in part on the indication of the last barrier command; and determining that the index of the barrier command is less than or equal to the index of the last barrier command, where the portion of the data is validated based at least in part on the index of the barrier command associated with the portion of the data being less than or equal to the index of the barrier command.

Aspect 10: The apparatus of any of aspects 1 through 9 where and the method, apparatuses, and non-transitory, computer-readable medium, further includes operations, features, circuitry, logic, means, or instructions, or any combination thereof for writing a second portion of the data to the second buffer as part of a second flushing operation.

Aspect 11: The apparatus of aspect 10, further including operations, features, circuitry, logic, means, or instructions, or any combination thereof for maintaining, based at least in part on the flushing operation, a state of the indication of the last barrier command based at least in part on determining that less than all of the data associated with the barrier command has been written to the memory device and updating, based at least in part on the second flushing operation, the indication of the last barrier command to indicate the barrier command.

Aspect 12: The apparatus of aspect 11, further including operations, features, circuitry, logic, means, or instructions, or any combination thereof for performing the recovery operation after the second flushing operation, where the portion of the data and the second portion of the data are validated during the recovery operation based at least in part on updating the indication of the last barrier command.

Aspect 13: The apparatus of any of aspects 1 through 12, further including operations, features, circuitry, logic, means, or instructions, or any combination thereof for the recovery operation occurs after the flushing operation.

Aspect 14: The apparatus of any of aspects 1 through 13 where the buffer includes a first buffer associated with single-level operations and a second buffer associated with multi-level operations and the method, apparatuses, and non-transitory, computer-readable medium, further includes operations, features, circuitry, logic, means, or instructions, or any combination thereof for writing, to the second buffer, second data for a second set of commands that is associated with a second barrier command and, to the first buffer, third data for a third set of commands that is associated with a third barrier command; performing the flushing operation for the first buffer, where the portion of the data and a portion of the third data are written to the memory device based at least in part on performing the flushing operation; and obtaining an index of the third barrier command based at least in part on the third data being flushed from the first buffer at an end of the flushing operation.

Aspect 15: The apparatus of aspect 14, further including operations, features, circuitry, logic, means, or instructions, or any combination thereof for obtaining, based at least in part on performing the flushing operation, an index of the second barrier command based at least in part on an initial entry of the second buffer storing the second data and determining the indication of the last barrier command based at least in part on a difference between the index of the third barrier command and the index of the second barrier command, where validating the portion of the data stored in the memory device is based at least in part on determining the indication of the last barrier command.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory, computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
    a buffer;
    a memory device comprising memory cells; and
    a controller coupled with the buffer and the memory device, the controller configured to cause the apparatus to:
        write, to the buffer, data for a set of commands that is associated with a barrier command;
        determine, based at least in part on a portion of the data to be flushed from the buffer, whether to update an indication of a last barrier command for which all of the associated data has been written to the memory device;
        perform a flushing operation based at least in part on determining whether to update the indication of the last barrier command, the flushing operation comprising transferring the portion of the data from the buffer to the memory device; and
        validate, during a recovery operation, the portion of the data stored in the memory device based at least in part on determining the barrier command is associated with the portion of the data and on updating the indication of the last barrier command to indicate the barrier command.

2. The apparatus of claim 1, wherein the controller is further configured to cause the apparatus to:
    store, based at least in part on the flushing operation, an index of the barrier command with the portion of the data, wherein determining the barrier command is associated with the portion of the data is based at least in part on the index of the barrier command.

3. The apparatus of claim 1, wherein the controller is further configured to cause the apparatus to:
    write, to the buffer, second data associated with a second set of commands that is associated with a second barrier command;
    write, from the buffer to the memory device as part of the flushing operation, a portion of the second data; and
    store, based at least in part on the flushing operation, an index of the second barrier command with the portion of the second data.

4. The apparatus of claim 1, wherein the controller is further configured to cause the apparatus to:
    write, from the buffer to the memory device as part of a second flushing operation, a second portion of the data; and
    store, based at least in part on the second flushing operation, an index of the barrier command with the second portion of the data.

5. The apparatus of claim 4, wherein the controller is further configured to cause the apparatus to:
    maintain, based at least in part on the flushing operation, a state of the indication of the last barrier command based at least in part on determining that less than all of the data associated with the barrier command has been written to the memory device; and
    update, based at least in part on the second flushing operation, the indication of the last barrier command to indicate the barrier command.

6. The apparatus of claim 5, wherein the controller is further configured to cause the apparatus to:
    perform the recovery operation after the second flushing operation, wherein the portion of the data and the second portion of the data are validated during the recovery operation based at least in part on updating the indication of the last barrier command.

7. The apparatus of claim 1, wherein, to determine whether to update the indication of the last barrier command to indicate the barrier command, the controller is further configured to cause the apparatus to:
    determine whether all of the data associated with the barrier command is to be written to the memory device.

8. The apparatus of claim 1, wherein the controller is further configured to cause the apparatus to:
    update the indication of the last barrier command to indicate the barrier command based at least in part on determining that all of the data associated with the barrier command has been written to the memory device.

9. The apparatus of claim 1, wherein, to validate the portion of the data stored in the memory device, the controller is further configured to cause the apparatus to:
    determine that the barrier command is associated with the portion of the data based at least in part on an index of the barrier command stored with the portion of the data;
    determine an index of the last barrier command based at least in part on the indication of the last barrier command; and
    determine that the index of the barrier command is less than or equal to the index of the last barrier command, wherein the portion of the data is validated based at least in part on the index of the barrier command associated with the portion of the data being less than or equal to the index of the barrier command.

10. The apparatus of claim 1, wherein:
the buffer comprises a first buffer associated with single-level operations and a second buffer associated with multi-level operations;
to write the portion of the data to the buffer during the flushing operation, the controller is further configured to cause the apparatus to write the portion of the data to the first buffer; and
the controller is further configured to cause the apparatus to write a second portion of the data to the second buffer as part of a second flushing operation.

11. The apparatus of claim 10, wherein the controller is further configured to cause the apparatus to:
maintain, based at least in part on the flushing operation, a state of the indication of the last barrier command based at least in part on determining that less than all of the data associated with the barrier command has been written to the memory device; and
update, based at least in part on the second flushing operation, the indication of the last barrier command to indicate the barrier command.

12. The apparatus of claim 11, wherein the controller is further configured to cause the apparatus to:
perform the recovery operation after the second flushing operation, wherein the portion of the data and the second portion of the data are validated during the recovery operation based at least in part on updating the indication of the last barrier command.

13. The apparatus of claim 1, wherein the recovery operation occurs after the flushing operation.

14. The apparatus of claim 1, wherein the buffer comprises a first buffer associated with single-level operations and a second buffer associated with multi-level operations, the data for the set of commands being written to the first buffer, wherein the controller is further configured to cause the apparatus to:
write, to the second buffer, second data for a second set of commands that is associated with a second barrier command and, to the first buffer, third data for a third set of commands that is associated with a third barrier command;
perform the flushing operation for the first buffer, wherein the portion of the data and a portion of the third data are written to the memory device based at least in part on performing the flushing operation; and
obtain an index of the third barrier command based at least in part on the third data being flushed from the first buffer at an end of the flushing operation.

15. The apparatus of claim 14, wherein the controller is further configured to cause the apparatus to:
obtain, based at least in part on performing the flushing operation, an index of the second barrier command based at least in part on an initial entry of the second buffer storing the second data; and
determine the indication of the last barrier command based at least in part on a difference between the index of the third barrier command and the index of the second barrier command, wherein validating the portion of the data stored in the memory device is based at least in part on determining the indication of the last barrier command.

16. A non-transitory, computer-readable medium storing code, comprising instructions which, when executed by a processor of an electronic device, cause the electronic device to:
write, to a buffer, data for a set of commands that is associated with a barrier command;
determine, based at least in part on a portion of the data to be flushed from the buffer, whether to update an indication of a last barrier command for which all of the associated data has been written to a memory device;
perform a flushing operation based at least in part on determining whether to update the indication of the last barrier command, the flushing operation comprising transferring the portion of the data from the buffer to the memory device; and
validate, during a recovery operation, the portion of the data stored in the memory device based at least in part on determining the barrier command is associated with the portion of the data and on updating the indication of the last barrier command to indicate the barrier command.

17. The non-transitory, computer-readable medium of claim 16, wherein the instructions, when executed by the processor of the electronic device, further cause the electronic device to:
store, based at least in part on the flushing operation, an index of the barrier command with the portion of the data, wherein the indication comprises the index of the barrier command.

18. The non-transitory, computer-readable medium of claim 16, wherein the instructions, when executed by the processor of the electronic device, further cause the electronic device to:
write, to the buffer, second data associated with a second set of commands that is associated with a second barrier command;
write, from the buffer to the memory device as part of the flushing operation, a portion of the second data; and
store, based at least in part on the flushing operation, an index of the second barrier command with the portion of the second data.

19. The non-transitory, computer-readable medium of claim 16, wherein the instructions, when executed by the processor of the electronic device, further cause the electronic device to:
write, from the buffer to the memory device as part of a second flushing operation, a second portion of the data; and
store, based at least in part on the second flushing operation, an index of the barrier command with the second portion of the data.

20. The non-transitory, computer-readable medium of claim 16, wherein the instructions, when executed by the processor of the electronic device, further cause the electronic device to:
update the indication of the last barrier command to indicate the barrier command based at least in part on determining that all of the data associated with the barrier command has been written to the memory device.

21. A method, comprising:
writing, to a buffer, data for a set of commands that is associated with a barrier command;
determining, based at least in part on a portion of the data to be flushed from the buffer, whether to update an indication of a last barrier command for which all of the associated data has been written to a memory device;

performing a flushing operation based at least in part on determining whether to update the indication of the last barrier command, the flushing operation comprising transferring the portion of the data from the buffer to the memory device; and validating, during a recovery operation, the portion of the data stored in the memory device based at least in part on determining the barrier command is associated with the portion of the data and on updating the indication of the last barrier command to indicate the barrier command.

22. The method of claim 21, further comprising:

storing, based at least in part on the flushing operation, an index of the barrier command with the portion of the data, wherein the indication comprises the index of the barrier command.

23. The method of claim 21, further comprising:

writing, to the buffer, second data associated with a second set of commands that is associated with a second barrier command;

writing, from the buffer to the memory device as part of the flushing operation, a portion of the second data; and storing, based at least in part on the flushing operation, an index of the second barrier command with the portion of the second data.

24. The method of claim 21, further comprising:

writing, from the buffer to the memory device as part of a second flushing operation, a second portion of the data; and storing, based at least in part on the second flushing operation, an index of the barrier command with the second portion of the data.

25. The method of claim 21, further comprising:

updating the indication of the last barrier command to indicate the barrier command based at least in part on determining that all of the data associated with the barrier command has been written to the memory device.

* * * * *